United States Patent [19]

Santini et al.

[11] Patent Number: 5,571,862
[45] Date of Patent: Nov. 5, 1996

[54] STABILIZED POLYACRYLAMIDE EMULSIONS AND METHODS OF MAKING SAME

[75] Inventors: John J. Santini; N. Alan Yankie, both of Mobile, Ala.

[73] Assignee: Cytec Technology Corp., Wilmington, Del.

[21] Appl. No.: 345,953

[22] Filed: Nov. 28, 1994

[51] Int. Cl.$^6$ .................................................. C08F 2/32
[52] U.S. Cl. ........................... 524/801; 525/369; 525/386
[58] Field of Search ................................................ 524/801

[56] References Cited

U.S. PATENT DOCUMENTS

| | | | |
|---|---|---|---|
| 5,008,321 | 4/1991 | Hartmann et al. | 524/801 |
| 5,126,395 | 6/1992 | End et al. | 524/801 |
| 5,286,806 | 2/1994 | Neff et al. | 525/369 |

FOREIGN PATENT DOCUMENTS

| | | |
|---|---|---|
| 2281387 | 3/1978 | France . |
| 1.040.948 | 12/1979 | Italy . |
| 75/4006 | 9/1976 | South Africa . |
| 91/75 | 8/1976 | Zambia . |

*Primary Examiner*—Bernard Lipman
*Attorney, Agent, or Firm*—Bernard Lau

[57] ABSTRACT

Dispersions of polyacrylamide particles are formed and treated with a caustic material to hydrolyze the polymer to form anionic acrylamide polymers. A preferred technique for forming these products comprises the formation of a stabilized water-in-oil emulsion of aqueous acrylamide monomer, polymerizing the monomer, reacting the polymer emulsion thus formed with a hydrolysis agent and inverting the resultant hydrolyzed polymers into solution.

11 Claims, No Drawings

STABILIZED POLYACRYLAMIDE EMULSIONS AND METHODS OF MAKING SAME

TECHNICAL FIELD

The invention relates generally to a stable polyacrylamide emulsion, including microemulsions, and the preparation thereof. More particularly, the invention is directed to anionic acrylamide polymers as well as methods for making these materials.

BACKGROUND TO THE INVENTION

Aqueous solutions of acrylamide polymers (i.e., "polyacrylamides" or "PAMs") are useful in applications such as thickening and dewatering of industrial and sewage wastes and the clarification, i.e., by flocculation techniques, of turbid aqueous solutions. In addition, as discussed, for example, in U.S. Pat. No. 4,034,809 to Phillips et al., these materials have been found to be useful in secondary and tertiary oil recovery processes wherein the polymer solution is introduced into subterranean oil-bearing formations to help increase the amount of crude oil recovered.

Typically, PAMs are available as powders or as finely divided solids and are dissolved in water to form aqueous solutions for use in a particular application. It is difficult and time-consuming, however, to dissolve these dry polymers in water, particularly in the case of hydrolyzed acrylamide polymers. This is because the dry polymer is not readily dispersable in the liquid and thus has a tendency to form lumps upon contact with the water. Such lumps typically require an extended period, sometimes as long as 6 to 10 hours, to dissolve.

U.S. Pat. No. 3,624,019 to Anderson et al. discloses a polymeric emulsions comprising a water-in-oil emulsion having dispersed therein finely divided droplets of a water-soluble vinyl addition polymer solution. Polyacrylamide is a preferred polymer disclosed by the reference. The polymer-containing emulsions described by Anderson et al. are stable. When inverted in the presence of water, the polymer goes into solution in a very short period of time as compared to the extended, i.e., 6 to 8 hour, period required for the dissolution of a dry solid polymer as described above. A water-in-oil polymerization process and method for making emulsion polymers is described in U.S. Pat. No. 3,284,393 to Vanderhoff et al.

A major problem associated with acrylamide polymer lattices of the type described above, however, is that when they are hydrolyzed, the emulsion becomes unstable. The polymer present within the emulsion coagulates and precipitates out of the water-in-oil emulsion, thus producing a product with little or no commercial value.

U.S. Pat. No. 4,171,296 to Connelly et al. discloses a method for hydrolyzing acrylamide polymers within a polymer latex, comprising a water-in-oil emulsion containing finely divided polyacrylamide, wherein the latex is stabilized by the addition of an alkali stable organic surfactant prior to hydrolysis. The method for producing the acrylamide polymer emulsion comprises polymerizing the acrylamide monomer utilizing an azo catalyst, i.e., 2,2'-azobis(isobutyronitrile) and a sequential monomer addition process. The disclosure of this reference is also limited to the production of polymers ranging in molecular weight from about 10,000 to 25,000,000.

Polymers such as those disclosed in Connelly et al., i.e., with a molecular weight up to about 25 million, are known to be relatively insensitive to detrimental side reactions. Such reactions have more of a tendency to occur in ultra high molecular weight PAMs. That is, the higher the molecular weight of the polymer, the greater the propensity for the polymer to engage in detrimental side reactions.

U.S. Pat. No. 5,286,806 to Neff et al., which is incorporated herein by reference, discloses a method for making and using high molecular weight acrylamide polymer emulsions, while reducing or eliminating entirely the degree of side chain reactions to form high and ultra high molecular weight polymers. The use of ultra high molecular weight polymers in this invention is particularly useful in thickening and flocculating applications.

This invention includes hydrolyzed polyacrylamide microemulsions. The preparation of microemulsions is discussed in U.S. Pat. No. 4,956,399 to Kozakiewicz et al., which is incorporated herein by reference.

The production of hydrolyzed acrylamide polymer emulsions by the addition of an alkaline substance to an emulsion polyacrylamide backbone results, however, in ammonia as a by-product. Generally, the presence of the ammonia leads to problems in thickening and flocculating applications in that the product has an offensive odor and the basicity of the product remains high, thus causing the hydrolysis reaction to continue past the desired degree. This causes an increase in carboxylate content. The increase in carboxylate content is believed to lead to decreased performance by the polymer.

It would be a substantial advance to provide a partially hydrolyzed acrylamide polymeric emulsion which remained stable, i.e., did not hydrolyzed to the degree of deteriorating in performance. Also, an effective, efficient method for hydrolyzing high molecular weight acrylamide polymer emulsions, while reducing or eliminating the degree of side chain reactions, to form, respectively, high and ultra high molecular weight polymer without substantial presence of ammonia by-product, is both desirable and needed. Ultra high molecular weight polymers are particularly useful and are thus of even greater value due to their capacity to more effectively flocculate solids.

SUMMARY OF THE INVENTION

The present invention thus relates to an emulsion, including microemulsions, of partially hydrolyzed acrylamide polymer, and methods for making same, preferably high molecular weight partially hydrolyzed acrylamide polymer, and more preferably partially hydrolyzed polymers of "ultra high molecular weight." These terms are further defined below.

As used herein, the term "flocculating agent" generically means any material capable, upon application to a liquid stream containing a plurality of solid particles, of facilitating the removal of the solid particles from the stream to produce a substantially clear effluent. Thus "flocculation" as used herein broadly encompasses a variety of methods for the clarification of liquid effluents such as mill waste water streams.

The term "high solid inverse microemulsion" as used in this application generally means polymers having an average diameter size of the discontinuous phase being less than 4000 Å, preferably less than 2000 Å, and most preferably less than 1000Å. "High solid" generally means polymer content containing greater than about 10 percent solid.

In this invention, the acrylamide may generally be described as (alk)acrylamide. The "alk" position of the (alk)acrylamide may includes those having from 1 to 8 carbon atoms. The backbone of the (alk)acrylamide includes acrylamide, methacrylamide, ethacrylamide and the like. For purpose of this invention, acrylamide is interchangeable with (alk)acrylamide.

Acrylamide polymer having any molecular weight is within the scope of this invention. Solely for purposes of this invention, the phrase "high molecular weight" refers to acrylamide polymers having a molecular weight of at least about 10 million and the phrase "ultra high molecular weight", as used herein, means a polymer having a molecular weight of at least about 27 million. Ultra high molecular weight polymers are, as noted above, preferred for use with the invention. For convenience, unless otherwise indicated hereinafter, the phrase "high molecular weight" is used herein to include both "high" and "ultra-high" molecular weight polymers as defined above.

In the invention, liquid streams, i.e., of the type described above, are treated with a polymer solution prepared as follows: A water-in-oil emulsion which comprises, as the discontinuous phase, small droplets of an aqueous acrylamide monomer solution containing a redox polymerization catalyst and, as the continuous phase, a liquid hydrocarbon containing an oil-soluble emulsifying agent. The acrylamide monomer is then polymerized to form aqueous acrylamide polymer by any means. One embodiment of the invention utilizes high molecular weight polymers with a molecular weight of 10+million. In a further embodiment, ultra high molecular weight polymers, with a molecular weight above about 27 million are used. At molecular weights of about 27 million and above, the need to reduce or eliminate side chain reaction becomes a factor in the polymer forming process. In a still further embodiment, the molecular weight range of the ultra high molecular weight polymers used is 34+ million. The emulsion may be stabilized by the addition of an oil-soluble emulsifying agent or an organic surfactant.

Solely for purposes of this invention, stabilized hydrolyzed (alk)acrylamide emulsions include stabilized microemulsions as well as stabilized macroemulsions of the aforesaid polymer.

The flocculant formation process thereafter further comprises at least partially hydrolyzing the acrylamide polymer by the addition of a caustic material (i.e., so as to convert at least a portion of the amide groups on the polymer to carboxylate groups), which results in the formation of a partially hydrolyzed high molecular weight anionic acrylamide polymer flocculating agent. The flocculating agent is then added to a solid containing liquid stream for agglomeration and subsequent removal of the solids therefrom.

The flocculating agents thus produced have improved properties and are therefore particularly useful, as described below, in a variety of industrial solid-liquid separations such as in flocculating mineral slurries or any effluents from, for example, paper mills or deinking plants. The flocculating agents of the invention are particularly effective in facilitating the removal of solids from such liquid effluents to form substantially clear liquid discharge streams. That is, with the use of the high molecular weight acrylamide polymer emulsions of the invention, the speed and efficiency of flocculation is substantially enhanced in comparison to processes utilizing prior art products comprising low to medium weight polymers.

The enhancements include, for example, reducing the settling times and increasing the settling rate of flocculated systems. Further, the use of the preferable ultra high molecular weight PAM flocculating agents described herein additionally permits the user to achieve a substantial reduction in the amount of suspended solids in the liquid stream at dosages greatly reduced from those required with the use of prior art low to medium molecular weight PAMs.

The improvement of this invention includes, but is not limited to, the stabilization of a partially hydrolyzed acrylamide polymer emulsion such that performance is maintained by the elimination of ammonia by-products resulting from acrylamide hydrolysis with an alkaline substance. The elimination of the by-product prevents the propagation of undesired hydrolysis reactions which may occur in the presence of ammonia. The presence of ammonia leads to several problems in that the product has an offensive odor and the hydrolysis reaction continues past the desired degree, resulting in an undesirable increase in carboxylate content. Neutralization of the ammonia, or removal of the ammonia by methods such as vacuum stripping, reduces odors, lowers the pH, and retards further undesired hydrolysis of the polymer.

DETAILED DESCRIPTION OF THE PREFERRED EMBODIMENTS

The formation of the polymer emulsion is generally known in the art and involves several steps as described below. In a first step a water-in-oil emulsion is formed, comprising, in the discontinuous phase, aqueous droplets of an acrylamide monomer. The continuous phase of the emulsion is a liquid hydrocarbon containing an oil soluble emulsifying agent.

The emulsion additionally may contain a redox polymerization catalyst, such as one of those disclosed in U.S. Pat. No. 4,339,371 to Robinson et al., the disclosure of which is incorporated herein by reference. In general, useful catalyst systems include, for example, persulfate-mercaptan systems, persulfate-sulfite systems, chlorate-bisulfite systems and hydrogen peroxide-iron systems. The preferred redox catalyst for use in the invention is tertiary butyl hydroperoxide-sodium metabisulfite.

With regard to the formation of the polymer emulsion, the oils used therein to form the continuous phase are selected from a large group of organic liquids including liquid hydrocarbons and substituted liquid hydrocarbons. Useful liquid hydrocarbons include, but are not limited to, aromatic and aliphatic compounds such as benzene, xylene, toluene, mineral oils, kerosene and napthas. The preferred oils for use with the invention are cyclic linear or branched paraffinic oils. These materials are inexpensive, insoluble in water, and relatively non-toxic and, due to their relatively high flash point, they create a minimal fire risk in industrial applications.

The relative amounts of the components which comprise the emulsion may vary over a wide range. Generally however, the emulsion is comprised of from about 20 to about 50% by weight of water; from about 10 to about 40% by weight of the oil and from about 20 to about 40% by weight of polymer. In order to obtain a stable emulsion, it is generally necessary, however, to add an oil soluble emulsifying agent or an organic surfactant.

When adding an oil soluble emulsifying agent, the required amount of this agent may be determined by routine experimentation. Generally, however, an amount ranging from about 0.1 to about 30% by weight, based upon the weight of the oil, is used. More preferably, the amount used is within the range of about 3 to about 15% by weight of the oil.

Emulsifiers useful for preparing macroemulsions are known in the art as "low HLB materials", wherein HLB stands for "hydrophilic-lyophilic balance". These materials are well documented in the relevant literature, for example, the Atlas HLB Surfactant Selector which is commonly referred to by those in this field.

Preferred emulsifiers include the sorbitan esters and their ethoxylated derivatives. Sorbitan monooleate is particularly preferred for this purpose. Other emulsifiers which may be used include, for example, those discussed in U.S. Pat. No. 3,284,393 to Vanderhoff et al. noted above. The invention is not limited only to these emulsifiers, however. Other emulsifiers, such as certain high HLB materials, may be used as long as they are capable of producing good water-in-oil emulsions.

Optionally, organic surfactants may be used with the present invention, these materials must be capable of stabilizing the final product. Any compound meeting this requirement may be used. The surfactant chosen for use in a particular application should, however, be tried first with a small sample and used on a case by case basis to prevent untoward effects due to variations in the polymeric emulsion and/or the hydrolysis agents.

Preferred organic surfactants are formed by the reaction of an aliphatic hydrocarbon alcohol or amine, wherein the alcohol or amine preferably has from 10 to 20 carbon atoms, with from 2 to 10 moles of ethylene oxide per mole of the alcohol or amine. However, other amines and alcohols, i.e., those having more than 20, or less than 10 (but at least 8) carbon atoms, are also capable of use in the invention. Most preferably, the alcohol or amine comprises from 12 to 18 carbon atoms and is reacted with from 2 to 4 moles of ethylene oxide per mole of the alcohol or amine.

A particularly preferred surfactant is formed by reacting oleyl amine with ethylene oxide to form an ethoyxlated oleyl amine. Other useful organic surfactants are formed, for example: (a) by reacting one mole of oleyl alcohol with two moles of ethylene oxide to form polyoxyethylene (2) oleyl alcohol, or (b) by reacting one mole of lauryl alcohol and four moles of ethylene oxide to form polyoxyethylene (4) lauryl ether.

In one embodiment of the invention, the surfactant is added to the polymeric emulsion in a concentration of from 0.10 to 15% by weight of the emulsion and thoroughly mixed therewith. It is most preferred, however, to use a concentration of the surfactant ranging between about 0.5 to 3% by weight.

In a preferred embodiment, the polymeric emulsion is formed as described above, having dispersed therein: (1) finely divided droplets of an aqueous solution of high molecular weight acrylamide polymer, and (2) an organic surfactant formed, e.g., by the reaction of an aliphatic hydrocarbon alcohol with from 10 to 20 carbon atoms and from 2 to 10 moles of ethylene oxide per mole of the alcohol. In a subsequent step, the polymer is reacted with a "hydrolysis agent," as described below, to form a hydrolyzed high molecular weight acrylamide polymer. The advantage of using this process is that there is one less step in the method, i.e., the organic surfactant is already present in the polymeric emulsion.

Hydrolysis agents useful in the present invention include, but are not limited to, alkali metal hydroxides and quaternary ammonium hydroxides. A useful quaternary ammonium hydroxide is tetra methyl ammonium hydroxide. The preferred hydrolysis agents, however, are the alkali metal hydroxides and, more particularly, sodium, potassium, and lithium hydroxides. In fact, however, any material which will provide an alkali solution may be used as a hydrolysis agent.

The hydrolysis agent should be added to the polymeric emulsion as an aqueous solution slowly and with mixing. The most preferred hydrolysis agent is a 10 to 50% aqueous solution of alkali metal hydroxide, with a 20 to 40% solution being more preferred and a solution of about 30% being most preferred. The concentration of the solution of the alkali metal hydroxide is within the range of 0.2 to 30%, preferably 4 to 12%, by weight based on the polymeric emulsion. The percentage of hydrolysis agent used will vary however, according to the degree of hydrolysis desired.

While solutions of about 30% concentration of the alkali metal hydroxides are particularly useful, it is important to note that higher or lower concentrations of alkali metal hydroxides in aqueous media may also be used. Conditions favoring the use of lower concentrations of the hydrolysis agent include the desire for low levels of hydrolysis and stability factors. Higher concentrations may be used when a substantial degree of hydrolysis is desired without excessive dilution. As would be understood by one skilled in the art, stability considerations also play a role in this determination.

The hydrolysis reaction may be conducted at room temperature but more favorable results are obtained at elevated temperatures. Generally the reaction may be performed within the range of from about 10° to 70° C. The preferred temperature range for this reaction is, however, from about 35° to 55° C. The length of time required for the hydrolysis reaction depends upon the reactants, their concentrations, the reaction conditions and the degree of hydrolysis desired.

The acrylamide polymer is partially hydrolyzed. As such, the acrylamide polymer of the present invention is hydrolyzed by the process set forth herein to a degree of between about 3 to 80%. Depending upon the reaction conditions described above, typically a 5 to 60% hydrolysis is obtained, with the preferred range being 10 to 50%. The degree of hydrolysis should be at least 3%, more preferably at least 5%, and most preferably at least 10%. In this invention, a most preferred degree of hydrolysis is from about 20% to about 35%. This hydrolysis procedure and all of the reaction conditions and ranges described herein apply to both embodiments of this invention: that is, (1) the formation of the polymeric emulsion including the organic surfactant or emulsifier and (2) the addition, in a separate step, of the organic surfactant or emulsifier to the polymeric emulsion.

After the reaction with the hydrolysis agent, the hydrolyzed acrylamide polymer thus formed remains dispersed throughout the water-in-oil emulsion, similar to those emulsions disclosed in U.S. Pat. No. 3,624,019 to Anderson et al. discussed above. The hydrolyzed polymer emulsion is thereafter inverted in a manner similar to that disclosed in Anderson et al. such that the emulsion releases the hydrolyzed acrylamide polymer in water in a very short period of time.

To accomplish this result, it is preferred, or it may be necessary, to employ a second surfactant (i.e., an "inverting agent") by adding it to either the polymer-containing emulsion or to the water into which the emulsion is to be dissolved. Alternatively, the surfactant used to form the emulsion may be self-inverting and no secondary emulsifier addition is necessary. These so-called "breaker" materials preferably have a hydrophilic-lyophilic balance ("HLB") greater than about 10. They preferably include the ethoxylated alcohols, ethoxylated alkyl phenols and ethoxylated amines, as well as a variety of other compositions known to those of ordinary skill in the art. A particularly preferred surfactant for use in inverting the anionic high molecular weight PAM is nonylphenyl ethoxylate.

The addition of the inverting agent causes the emulsion to rapidly release the polymer in the form of an aqueous solution. The surfactants listed in Anderson et al. have been found to easily invert hydrolyzed acrylamide polymer. However, due to variations in the polymeric lattices, surfactants used for inversion should be tried on a case by case basis.

The polymers thus produced are useful, as noted above, in a variety of industrial flocculation applications. The performance of the preferred hydrolyzed ultra high molecular weight polymers thus formed has in fact been found to be vastly improved over those chemically similar polymers produced as in U.S. Pat. No. 4,171,296 in applications such as settling processes, where molecular weight is a controlling variable.

Once the emulsion is formed, the acrylamide monomer may be polymerized with methods that are known in the art. For example, the acrylamide monomer may also be bulk polymerized with the aid of the catalyst. The polymer preferably has a molecular weight of at least about 10 million. Such polymeric lattices and the method of their production are described in U.S. Pats No. 3,624,019 to Anderson et al. and U.S. Pat. No. 3,284,393 to Vanderhoff et al. discussed above, the disclosure of each of which is incorporated herein by reference.

Hydrolyzed (alk)acrylamide polymers in inverse microemulsions are also included in the scope of this invention. Microemulsions allow the composition to be prepared at a high polymer solids content. The preparation of microemulsion is well known to those skilled in the art and disclosed in, for example U.S. Pat. Nos. 5,07,881; 5,037,863; 4,681, 912 and 4,521,317, the disclosure of each of which is incorporated herein by reference.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer droplets dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of suffactant or surfactant mixture, temperature, nature of the organic phase and composition of the aqueous phase.

Essential to the formation of the microemulsion, which may be defined as a transparent and thermodynamically stable solution, comprising two liquids insoluble in each other and a surfactant, in which the micelles are usually 1000 Å or less in diameter, is the selection of appropriate organic phase and surfactant.

The discontinuous polymer-containing phase of microemulsions from droplets or micelles, which are usually aqueous and usually have a volume average droplet diameter which is less than about 2500 Å, preferably less than about 2000Å, and most preferably less than about 1000 Å. Some microemulsions may have a volume average droplet as large as about 3000 Å.

For the microemulsion, the HLB value ranges from about 8 to about 12. Outside this range, formation of inverse microemulsion generally cannot be obtained.

Further description of the preparation of inverse microemulsion are described in the U.S. Pat. No. 4,956,399, and is incorporated herein by reference.

The polymer is thereafter hydrolyzed as described further below. The molecular weight of the hydrolyzed product is indicated by a corresponding intrinsic viscosity of at least about 15 dl/g. and a solution viscosity of at least about 4 mPa.s. More preferably, the polymer is an ultra high molecular weight polymer with a molecular weight of greater than about 27 million having an intrinsic viscosity of at least about 32 dl/g. and a solution viscosity of at least about 7 mPa.s. Most preferably, the molecular weight of the polymer is 34 million or greater with a corresponding intrinsic viscosity of 35 dl/g. and a solution viscosity of at least about 7 mPa.s.

Hydrolysis of polyacrylamide produces ammonia as a by-product. The ammonia by-product may be subsequently neutralized by addition of an acidic substance. Useful acids include, but are not limited to, acetic acid, glutaric acid, citric acid, phosphoric acid and sulfuric acid. The acidic solution may be introduced directly into the polymeric emulsion. Neutralizing the ammonia by-product may also be accomplished by using carbon dioxide gas. The gas may be introduced by bubbling it directly into the polymeric emulsion. Virtually any inorganic or organic acid is operable to neutralize the ammonia by-product, as can virtually any acidic gaseous substance, all of which are within the scope of this invention.

The ammonia by-product may also be vacuum stripped. Any apparatus useful in the vacuum removal of vapor is within the scope of this invention. For instance, a vacuum line connected directly to the vapors emanating from the emulsion is used. The emulsion may be mixed and stirred at frequent time intervals to introduce the ammonia into the vapor for vacuum removal. Alternatively, the emulsion may be aerated by bubbling of inert gas.

To monitor the neutralizing or vacuum stripping of the ammonia by-product, a conventional pH measuring apparatus may be used to measure the pH potentiometrically. For purpose of this invention, neutralization of the emulsion takes place when the pH is from lower than 9.5, more preferably lower than about 9.0, and most preferably lower than 8.0. One method used in this invention is to insert the glass electrode directly on to the polymeric emulsion. The operation of the pH potentiometer is known in the art. Alternatively, the use of colorimetric measurements may also be applicable.

After neutralization or vacuum stripping, the resulting polymeric emulsion is substantially free of ammonia. For purposes of this invention, the ammonia does not need to be completely neutralized or removed. The emulsion needs only be substantially free of ammonia. A polymeric emulsion is substantially free of ammonia when there is no further hydrolysis after the initial reaction has taken place. Generally, after polymerization occurs, the ammonia produced as a by-product may lead to further hydrolysis. By neutralizing or vacuum stripping, the emulsion will be substantially free of ammonia, thus preventing further hydrolysis. The stability of the resulting emulsion is indicated by measuring its carboxylate content. A leveling off of the change in carboxylate content indicates that no further hydrolysis has taken place.

The molecular weight of the polymers produced as described above may be determined, e.g., by viscometry methods such as Solution (also known as "Standard") Viscosity ("SV"), or Intrinsic Viscosity ("IV"). Both of these processes are well-known to persons of ordinary skill in the art.

It is also well known in the art that the intrinsic viscosity of a polymer correlates to the molecular weight of that polymer using the formula:

$$IV = 0.000373 \times \text{molecular weight}^{0.66} \qquad (1)$$

Intrinsic viscosity is a cumbersome and time consuming property to measure, however. As practiced in the present invention, the IV measurement is taken with a four bulb Cannon-Ubbelohde capillary viscometer at concentrations of, for instance, 100, 250, 500 and 1,000 ppm in 1 molar sodium chloride at 30° C. and at shear rates ranging between 50 to 1,000 sec$^{-1}$. The data thus obtained is subjected to linear regression to extrapolate it to zero shear rate and zero polymer concentration. The value obtained with this calculation is the intrinsic viscosity of the polymer.

Solution (i.e., standard) viscosity values are relatively easier, i.e., less cumbersome and time consuming, to obtain than intrinsic viscosity values. Moreover, SV values can be correlated to IV values for a particular polymer. Thus, polymeric molecular weights can be approximated by reference to the solution viscosity of the polymer. That is, the higher the SV value for a particular polymer, the higher its molecular weight. For example (the following values are approximate):

SV 4 mPa.s=IV 15 dl/g.=MW 10,000,000

SV 5 mPa.s=IV 25 dl/g.=MW 20,000,000

SV 6 mPa.s=IV 30 dl/g.=MW 26,000,000

SV 7 mPa.s=IV 32 dl/g.=MW 30,000,000

SV 10.9 mPa.s=IV 50 dl/g.=MW 60,000,000

For purposes of the present invention, SV values are determined using a 0.1% polymer solution in 1 molar NaCl at 25° C. The measurement is taken using a Brookfield viscometer with a UL adapter at 60 rpm when the SV is 10 or less. When the SV is greater than 10 the viscosity at 30 rpm is determined and multiplied by 1.7.

A correlation also exists between the standard viscosity value of a polymer and the degree of hydrolysis to which the polymer has been subjected. That is, for polymers wherein the degree of hydrolysis (i.e., the degree to which the amide groups are converted to carboxylate groups) is generally at least about 5 mole %, the SV value is about 7 mPa.s or greater. For those polymers having a degree of hydrolysis of about 10 mole % or greater, the SV is generally at least about 8 mPa.s. Further, when the hydrolysis range is about 20 mole % or more, the SV value is generally at least about 9 mPa.s.

The relation between the SV and IV of a polymer and the use of this information to determine the molecular weight of the polymer is clearly set forth in the Examples provided below. The molecular weight of the polymer was determined from the IV value with the use of formula (1) noted above. Thus, in a case where only the SV value of the polymer (and not the IV) is known, it is a simple matter to roughly determine the polymer's approximate molecular weight by estimating the IV from a linear relationship of two extremes and then using Equation 1 hereinabove.

Thus although one can calculate with a high degree of exactitude the molecular weight of a polymer within a solution using the IV value of the subject polymer with the Formula 1 provided above, the difficulty in obtaining these IV values, in terms of time and attention to detail required, is outweighed by the relative ease of using SV values for this purpose. This is because such SV values are relatively simple to obtain and may be mathematically correlated, as explained above, to corresponding IV values, thus permitting one to obtain a rough determination of the polymer's molecular weight based upon the SV value of the solution alone. As noted above, the preferred PAMs for use with the present invention, are those having an ultra high molecular weight of at least about 27 million, an intrinsic viscosity (IV) value of at least about 32 dl./g and a solution viscosity (SV) value of at least about 7 mPa.s. It is even more preferred, however, to use PAMs having a molecular weight of 34 million or more.

One such application is in flocculating mineral slurries. The method comprises adding to such a slurry an effective amount, i.e., between about 1 and 10,000 ppm, and preferably between about 10 to 1,000 ppm, based on the solid content of the slurry, of the high molecular weight anionic water-in-oil emulsion of partially hydrolyzed acrylamide polymer to flocculate the solid particles within the slurry. These particles are then removed from the slurry, leaving a substantially clear liquid stream. The solution of the emulsion used to flocculate the slurry preferably contains a concentration of the emulsion of between about 0.05 and 3% by weight.

An advantage of this invention is the elimination of further hydrolysis of a partially hydrolyzed acrylamide polymer after an initial phase of hydrolysis has occurred. A polyacrylamide may undergo hydrolysis under alkaline conditions in a controlled degree. For example, a base of a predetermined concentration may be added to the polyacrylamide to the extent that the polymer will be expected to hydrolyze to a certain degree. Because hydrolysis of polyacrylamide may lead to by-products, such as ammonia, which may cause subsequent hydrolysis, the polymer may then undergo undesired hydrolysis. This invention prevents the occurrence of undesired hydrolysis, which may take place after the initial phase of hydrolysis. Specifically, by the introduction of acid into the reaction to neutralize the ammonia, or by removal of the ammonia from the reaction, undesired reactions involving ammonia will be reduced or eliminated.

An additional embodiment of the invention concerns the use of the polymer emulsion described above for flocculating, for example, effluent from a paper mill or alternatively, a process water stream from a deinking plant where ink is removed from paper to permit the fibers to be recycled. Further, the products of this invention are useful in facilitating a wide range of solid-liquid operations. The cationic polymers may be used in the dewatering of biologically treated suspensions, such as sewage and other municipal or industrial sludges, the drainage of cellulosic suspension such as those found in paper production, e.g., paper water, and settlement of various inorganic suspensions, i.e., refinery waste, food waste, etc.

The process involves the formation of a mixture by adding to effluent being treated the first mixture an effective amount, i.e., of between about 1 and 10,000 ppm and preferably between about 10 to 1,000 ppm, based on the weight of solids in the effluent, of an aqueous solution of the water-in-oil emulsion of partially hydrolyzed acrylamide polymer of the present invention to flocculate the solid particles for removal from the solution. As a result, a substantially clear effluent stream, substantially free of particulate material, is formed. Preferably a coagulant or a cationic polymer, e.g., polydiallyl dimethyl ammonium chloride, cationic polyacrylamide or polyamine, is first added to the effluent being treated. For any particular flocculating application, the optimum amount of the emulsion to be added can be determined by one of ordinary skill in the art by conducting routine testing.

The stabilized partially hydrolyzed polymer of the instant invention has a carboxylate content which generally increases by no more that about 20 mole % of its initial value after 38 days at 25° C. More preferably, the carboxylate content increases by no more than 10 mole % of its initial value after 38 days at 25° C. Most preferably, the carboxylate content increases by no more than 6 mole % of its initial value after 38 days at 25° C.

Similarly, after treatment of the emulsion comprising the partially hydrolyzed polymer and ammonia by-product with neutralization or removal of the ammonia, the carboxylate content preferably increases by no more than 20 mole % of its initial value after 70 days at 40° C., more preferably by no more than 10 mole % of its initial value and most preferably by no more than 6 mole % of its initial value, after 70 days at 40 C.

The invention is further described in the following examples:

EXAMPLES

The following examples are provided for the purpose of illustration only and should not be construed as limiting the invention in any way.

Example 1

An ultra-high molecular weight acrylamide polymer emulsion is formed by bulk polymerization in the presence of a redox catalyst, as described above. To 2,000 parts of the back-bone emulsion is added:

| | |
|---|---|
| low odor petroleum oil | 75 parts |
| ethoxylated fatty amine | 46.2 parts |
| 30% NaOH | 287 parts |
| ethoxylated nonylphenyl inverting agent | 44 parts |

The mixture is allowed to react with stirring at a temperature of 25 ⓡ to 30° C. The resultant product has a solution viscosity (SV) of 11.4 mPa.s and a initially measured carboxylate content of 29 mole %. As discussed above, the carboxylate content of the polymer is indicative of the degree of hydrolysis which the polymer has undergone and corresponds to the solution viscosity of the polymer.

Example 2

Example 1 is followed with the following exceptions: 478.3 parts of 30% NaOH and 47.9 parts of the ethoxylated nonylphenyl inverting agent are used. The resultant product has a SV of 12.1 mPa.s and a carboxylate content of 45 mole %.

Example 3

Clay Settling Tests

Kaolin clay dispersions in water (1000 ml samples in a one liter graduated cylinder) containing 5% solids are flocculated using the polymers described below which have been pre-dissolved in water prior to addition to the slurry. The flocculants are added at a concentration of 1.25 ppm on slurry. The settling time for the flocculated slurry is measured when the interface between clear liquid and clay dispersion is at 500 mls.

| Polymer | Settling time (secs.) |
|---|---|
| Polymer A* | 195 |
| Polymer of Example 1 | 105 |
| Polymer of Example 2 | 75 |

Polymer A = a standard acrylamide/acrylic acid polymer emulsion prepared by monomer copolymerization. SV = 6.3 mPa · s; carboxylate = 30 mole %.
*not representative of the invention This example demonstrates that the use of the polymers of the invention (i.e., those of Example I and II), provides an improvement (i.e., a reduction) in the settling time of the dispersion of between about 46–64%.

Example 4

Coal Refuse Tests

Flocculation tests using coal refuse from two coal mines are conducted.

| Mine | Feed solids (%) | Ash (%) | pH | Polymer (ppm) | Settling Rate (ft/hour) |
|---|---|---|---|---|---|
| I | 7.70 | 64.9 | 7.5 | A (4.96) | 120 |
| I | 7.70 | 64.9 | 7.5 | Ex. 2 (5.0) | 170 |
| II | 5.27 | 52.9 | 7.5 | A (2.0) | 50 |
| II | 5.27 | 52.9 | 7.5 | Ex 2 (2.0) | 190 |

For mine I, therefore, the improvement (i.e., increase) in settling rate offered with the use of the flocculating agent of the invention is about 41%. For mine II, this improvement is about 280%.

Examples 5 to 9

For Examples 5 to 9, Example 1 was repeated except the amount of hydrolyzing agent (NaOH) was varied to provide varying degrees of hydrolysis indicated by Table 1 to an ultra-high molecular weight polymer emulsion. The emulsion was then treated with acetic acid to neutralize the ammonia by-product resulting from the hydrolysis reaction. The addition of the acid to the polymer emulsion was proceeded slowly and with mixing. Examples 5 and 6 report the results where the initial degree of hydrolysis is 11.5 mole % at 25 ° C. Example 7 reports the results where the initial degree of hydrolysis is 11.5 mole % at 40 ° C. Example 8 reports the results where the initial degree of hydrolysis is 40.0 mole % at 40 ° C. Example 9 reports the results where the polymer emulsion was hydrolyzed using 41.4 mole % NaOH, followed by treatment of 50 mole % acetic acid. The increase in carboxylate content is monitored over time; the temperature remained constant temperature. As shown in Tables 1 to 4, control polymers were prepared having the same initial degrees of hydrolysis for comparative purposes. The carboxylate content (mole %) is generally measured by conventional nuclear magnetic resonance (NMR) techniques.

TABLE 1

Example 5

| Initial Degree of Hydrolysis | Control (without acetic acid) | | | Emulsion containing Acetic Acid of 41 mole % | | |
|---|---|---|---|---|---|---|
| | Days | Carboxylate (mole %) | pH | Days | Carboxylate (mole %) | pH |
| 11.5 Mole % at 25° C. | 0 | 9 | — | 0 | 11.5* | — |
| | 33 | — | 10.05 | 33 | — | 9.1 |
| | 38 | 17 | — | 38 | 12 | — |

*as measured by the initial degree of hydrolysis.

TABLE 2

Example 6

| CONTROL (without acetic acid) | | WITH ACETIC ACID (90 mole % relative to NaOH) | |
|---|---|---|---|
| DAYS | CARBOXYLATE (mole %) | DAYS | CARBOXYLATE (mole %) |
| 4 | 9 | 4 | 11.5* |
| 10 | 13 | | |
| | | 12 | 11 |
| 24 | 14 | | |
| | | 31 | 12 |
| 38 | 15 | | |
| 47 | 18 | | |
| 56 | 18 | | |
| | | 66 | 12 |
| 80 | 18 | | |
| | | 101 | 13 |
| 104 | 17 | | |
| | | 131 | 9 |
| 144 | 23 | | |

*estimated initial degree of hydrolysis

TABLE 3

Example 7

| Initial Degree of Hydrolysis | Control (without acetic acid) | | With Acetic Acid (41 mole %) | |
|---|---|---|---|---|
| | Days | Carboxylate (mole %) | Days | Carboxylate (mole %) |
| 11.5 mole % at 40° C. | 0 | 11.5* | 45 | 18 |
| | 57 | 30 | 111 | 23 |

*estimated initial degree of hydrolysis

TABLE 4

Example 8

| Initial Degree of Hydrolysis | Control (without Acetic Acid) | | | With Acetic Acid (58 mole %) | | |
|---|---|---|---|---|---|---|
| | Days | Carboxylate (mole %) | pH | Days | Carboxylate (mole %) | pH |
| 40.0 mole % at 40° C. | 5 | 44 | — | 5 | 40* | — |
| | | | | 8 | 40 | — |
| | 14 | — | 10.15 | 14 | — | 8.6 |
| | | | | 68 | 39 | — |
| | 87 | 46 | — | | | |
| | | | | 136 | 38 | — |
| | 144 | 48 | — | | | |

*estimated initial degree of hydrolysis

TABLE 5

Example 9

| TIME (days at 25° C.) | CARBOXYLATE (mole %) |
|---|---|
| 12 | 39 |
| 31 | 35 |
| 66 | 40 |
| 101 | 40 |
| 131 | 41 |

The data in Table 5 demonstrates that polymer emulsion after hydrolysis with 41.4 mole % NaOH, followed by treatment of 50 mole % of acetic acid results in the carboxylate content leveling off and remaining stable.

Example 10

Example 5 was repeated with the following exceptions: after the addition of NaOH, the emulsion was then treated with carbon dioxide to neutralize the ammonia by-product resulting from the hydrolysis reaction. The increase in carboxylate content was monitored as a function of aging temperature.

| Degree of hydrolysis (mole %) | $CO_2$ (mole %) | Temperature (Days) | Final Emulsion (C.) | pH |
|---|---|---|---|---|
| 21.5 | 0 | 33 | 25 | 10.3 |
| 21.5 | 50 | 33 | 25 | 9.6 |

This example demonstrated that the addition of carbon dioxide to neutralize the ammonia by-product as a result of hydrolysis reaction lowers the pH.

Examples 11 to 14

Example 5 was repeated with the following exceptions: after the addition of NaOH, the emulsion was then treated with various acids including glutaric acid, citric acid, phosphoric acid and sulfuric acid in amounts as shown in Table 6 to neutralize the ammonium by-product resulting from the hydrolysis reaction. The addition of the acid to the polymer emulsion was proceeded slowly and with mixing. The increase in carboxylate content was monitored as a function of time at a constant temperature.

TABLE 6

| Acid Used | % Solution | Grams of Acid Solution | Acid Mole | Final Emulsion pH | Ammonia Odor |
|---|---|---|---|---|---|
| — | — | 0.00 | 0.00 | 11.42 | Yes |
| glutaric | 34.98 | 19.98 | 0.05290 | 6.55 | No |
| glutaric | 34.98 | 10.13 | 0.02682 | 8.84 | No |
| citric | 50.00 | 14.32 | 0.03727 | 6.43 | No |
| citric | 50.00 | 7.75 | 0.02017 | 7.55 | No |
| phosphoric | 28.95 | 13.22 | 0.03905 | 8.62 | No |
| phosphoric | 28.95 | 9.47 | 0.02798 | 9.68 | Slight |
| sulfuric | 32.45 | 13.67 | 0.04523 | 7.48 | No |
| sulfuric | 32.45 | 8.84 | 0.02925 | 9.72 | Slight |

Example 15

Example 5 was repeated with the following exceptions: to a 30.5% hydrolyzed polyacrylamide emulsion after the addition of NaOH, the container enclosing the emulsion was fitted to a vacuum pump. The ammonia vapor emulsion was vacuum stripped to remove the ammonia. The product showed no increase in carboxylate content after aging at 25° C. for 224 days or 40° C. after 74 days. This example demonstrated that the vacuum stripping of ammonia by-product prevented further hydrolysis as indicated by no increase in carboxylate content.

While it is apparent that the invention herein disclosed is well calculated to fulfill the objectives stated above, it well be appreciated that numerous modifications and embodiments may be devised by those skilled in the art, and it is intended that the appended claims cover all such modifications and embodiments as fall within the true spirit and scope of the present invention.

We claim:

1. A method of preparing a stable emulsion of hydrolyzed poly(alk)acrylamide consisting essentially of the steps of:
   a) providing a water-in-oil emulsion having a discontinuous phase comprising (alk)acrylamide monomer, and a continuous phase comprising a liquid hydrocarbon and emulsifying agent(s);
   b) polymerizing said (alk)acrylamide monomer to form (alk)acrylamide polymer;
   c) reacting said (alk)acrylamide polymer with an alkaline substance to hydrolyze at least a portion of said polymer to produce
   1) a hydrolyzed poly(alk)acrylamide polymer; and
   2) ammonia; and
   d) neutralizing said ammonia by acetic acid or removing said ammonia.

2. The method of claim 1 wherein step d) comprises removing said ammonia by vacuum stripping.

3. The method of claim 1 wherein said alkaline substance is an alkaline metal hydroxide or quaternary ammonium hydroxide.

4. The method of claim 1 wherein said polymer has a molecular weight of at least 10 million as indicated by an intrinsic viscosity of at least 15 dl/g and a solution viscosity of at least 4 mPa.s.

5. The method of claim 1 wherein said polymer has a molecular weight of at least about 20 million as indicated by an intrinsic viscosity of at least about 32 dl/g. and a solution viscosity of at least about 7 mPa.s.

6. The method of claim 1 which further comprises adding to the emulsion, before step c), a stabilizing compound consisting of an oil-soluble emulsifying agent.

7. The method of claim 6 wherein said emulsion is stabilized by adding said oil-soluble emulsifying agent thereto in an amount of between 0.1 and 30% by weight, based upon the weight of the oil.

8. The method of claim 1 which further comprises adding an inverting agent to said hydrolyzed acrylamide polymer.

9. The method of claim 1 wherein polymerization is performed using a redox catalyst.

10. The method of claim 9 wherein the redox catalyst is tertiary butyl hydroperoxide-sodium metabisulfite or sulfur dioxide.

11. The method of claim 9 wherein the emulsion is a microemulsion.

* * * * *